United States Patent
Park et al.

(10) Patent No.: US 6,996,314 B2
(45) Date of Patent: Feb. 7, 2006

(54) AIR-BLOWN FIBER OPTIC CABLE

(75) Inventors: Hoon-Soo Park, Kwangmyong-shi (KR); Seung-Hyun Moon, Kumi-shi (KR); Joong-Jin Hwang, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/638,661

(22) Filed: Aug. 11, 2003

(65) Prior Publication Data

US 2004/0033036 A1 Feb. 19, 2004

(30) Foreign Application Priority Data

Aug. 17, 2002 (KR) .................. 10-2002-0048670

(51) Int. Cl.
*G02B 6/44* (2006.01)

(52) U.S. Cl. ........................................ 385/113
(58) Field of Classification Search ............ 385/113, 385/114
See application file for complete search history.

(56) References Cited

U.S. PATENT DOCUMENTS

| | | | | |
|---|---|---|---|---|
| 4,828,352 A | * | 5/1989 | Kraft ........................ 385/109 |
| 5,229,851 A | * | 7/1993 | Rahman .................... 385/114 |
| 5,343,549 A | * | 8/1994 | Nave et al. ................ 385/103 |
| 5,390,273 A | * | 2/1995 | Rahman et al. ............ 385/112 |
| 6,195,487 B1 | * | 2/2001 | Anderson et al. .......... 385/101 |
| 6,292,611 B1 | * | 9/2001 | Chamberlain et al. ...... 385/114 |
| 2004/0037522 A1 | * | 2/2004 | Sutehall et al. ............ 385/113 |

\* cited by examiner

*Primary Examiner*—Hae Moon Hyeon
(74) *Attorney, Agent, or Firm*—Cha & Reiter, L.L.C.

(57) ABSTRACT

Disclosed is an air-blown fiber-optic cable including: a central tensile member which is located axially through the center of the optic cable and provides a tension-resistant force; a plurality of loose tubes wound around the tensile member, each tube housing a plurality of optic fibers therein; aramid yarns for binding the loose tubes; and an outer sheath disposed on the outermost part of the optic cable to protect the interior thereof from the exterior environment.

8 Claims, 2 Drawing Sheets

AIR-BLOWN FIBER OPTIC CABLE

CLAIM OF PRIORITY

This application claims priority to an application entitled "Air-Blown Fiber Optic Cable," filed with the Korean Intellectual Property Office on Aug. 17, 2002 and assigned Serial No. 2002-48670, the contents of which are hereby incorporated by reference.

BACKGROUND OF THE INVENTION

1. Field of the Invention

The present invention generally relates to a fiber-optic cable. More particularly, the present invention relates to an air-blown fiber-optic cable, which is installed using air pressure within a pipeline having a small diameter.

2. Description of the Related Art

Currently, air-blown fiber technology exists in which the construction of communication networks laid underground includes tubes mounted within a variety of pipelines (for example, sewer pipelines), which already have been laid under the respective ground areas, and an optic cable is installed into the tubes by means of equipment using air pressure without the engineering work typically associated.

Such an air-blowing installation-type construction method, which applies the air-blown fiber technology, is used for constructing various kinds of communication networks—particularly, optical communication networks. The results are reduced costs and simpler construction as compared to the existing construction method for installing communication cables under the ground (for example, pulling-type construction method). The reason for these advantages is that the air-blowing installation-type construction does not require new piping or engineering works such as excavation and restoring landscaping for laying the new piping under the ground.

FIG. 1 is a cross-sectional view showing the structure of a loose-tube optic cable according to the conventional art. Such an optic cable is associated with the pulling-type construction method, in which the optical cable is pulled and pushed during the installation of it into piping. However, when such work is performed, an excessive tension is directly applied to the optic cable, thereby increasing the risk of deteriorating the characteristics of an optic fiber 130. To prevent this deterioration, the optic cable should have a structure for maintaining some tension resistance required for the construction method. As shown, the optic cable consists of a central tensile member 110, a plurality of loose tubes 150, a waterproof tape 160, an outer-layered tensile member 170, and an outer sheath 180.

The central tensile member 110 provides the optic cable with tension resistance and is placed in the center of the cable. The central tensile member 110 is made of, for example, FRP (fiberglass-reinforced plastic), and a layer 120 coated on the central tensile member 110 is comprised of a highly polymerized compound, such as PVC (polyvinyl chloride) and PE (polyethylene).

A plurality of optical fibers 130 is mounted in the respective loose tubes 150, and a hollow space of the loose tubes 150 is filled with the jelly compound 140 for the purpose of protecting the optical cables 130 from the external shock and absorbing moisture permeating the loose tubes 150. In addition, the loose tubes 150 can be gathered helically around the central tensile member 110.

The waterproof tape 160 surrounds the loose tubes 150, thereby preventing moisture from entering the interior of the tubes.

The outer-layered tensile member 170 encircles the waterproof tape 160, improves the tension resistance of the optic cable and can be made of strength yarn, such as glass yarn.

The outer sheath 180 is placed on the outermost part of the fiber-optic cable and made of a highly polymerized compound, such as PVC (polyvinyl chloride), PE (polyethylene), hytrel, nylon, and polypropylene, and formed by the extrusion process. Additionally, the sheath 180 may comprise rip cords adjacent to the inner wall thereof for facilitating its peeling off action.

As explained above, the loose-tube optic cable according to the conventional art is adapted for the pulling-type construction method and must have the elements, such as the coated central tensile member and the outer-layered tensile member, for maintaining the levels of tension resistance required for such a method. Accordingly, this requirement increases the weight and the outer diameter of the optic cable. Thus, it is not possible to employ the optic cable of this type in the air pressure-type construction method in which fiber-optic cables should be of a small diameter and weight.

SUMMARY OF THE INVENTION

Accordingly, the present invention is to provide an air-blown fiber-optic cable having a minimal outer diameter and a minimal weight.

In one embodiment of the present invention, there is provided an air-blown fiber-optic cable comprising: a central tensile member which is located axially through the center of the optic cable and provides a tension-resistant force; a plurality of loose tubes wound around the tensile member, each tube housing a plurality of optic fibers therein; aramid yarns for binding the loose tubes; and, an outer sheath disposed on the outermost part of the optic cable to protect the interior thereof from the exterior environment.

In the embodiment, the plurality of loose tubes may take a helical or reverse-helical (S-Z) configuration around the tensile member.

DETAILED DESCRIPTION OF THE PREFERRED EMBODIMENTS

Figure 1:
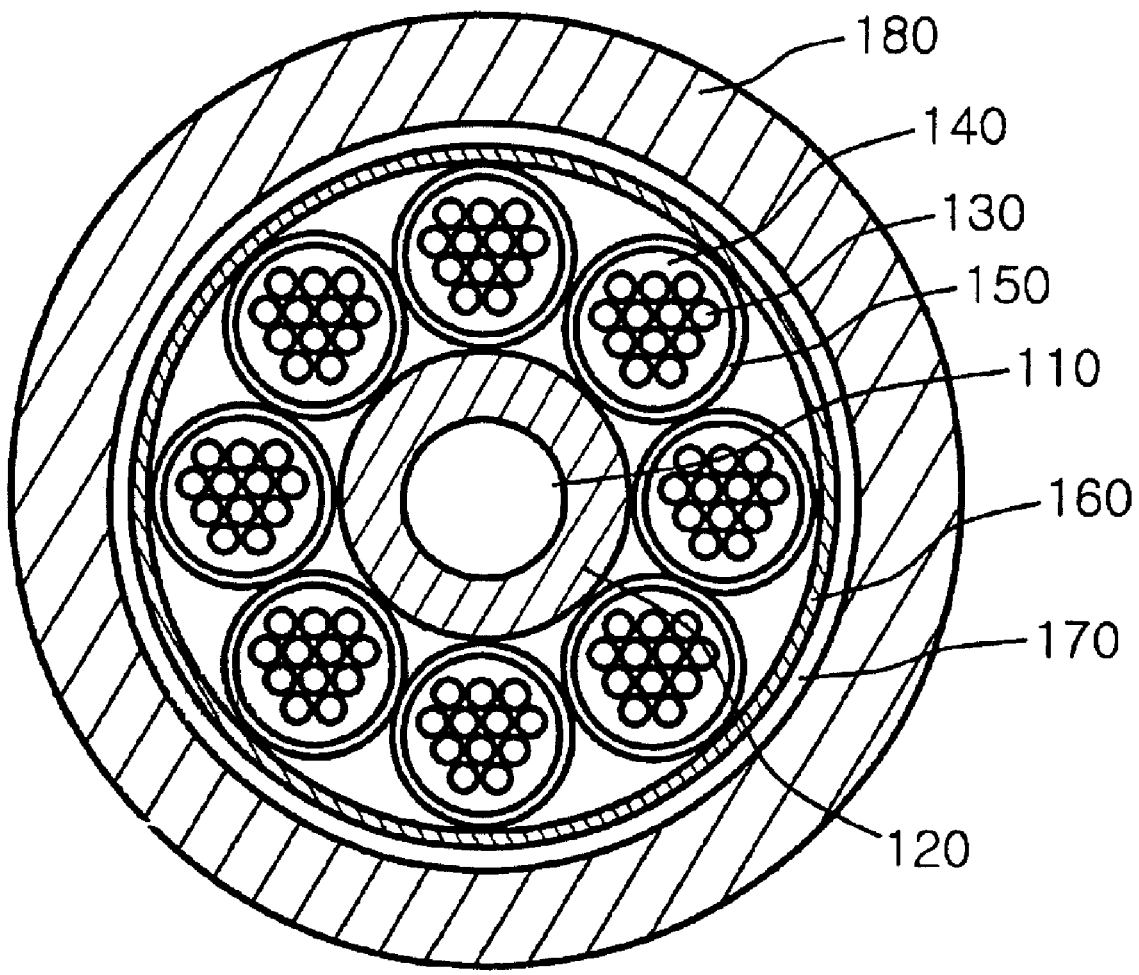
FIG. 1 is a cross-section showing a construction of a loose-tube optical cable in accordance with the prior art; and, FIG. 2 is a cross-section showing a construction of an air-blown fiber-optic cable in accordance with an embodiment of the present invention.

In accordance with the present invention, preferred embodiments of the present invention will be described with reference to the accompanying drawings. In the drawings, the same element, although depicted in different drawings, will be designated by the same reference numeral or character. For the purposes of clarity and simplicity, a detailed description of known functions and configurations incorporated herein will be omitted as it may make the subject matter of the present invention unclear.

Figure 2:
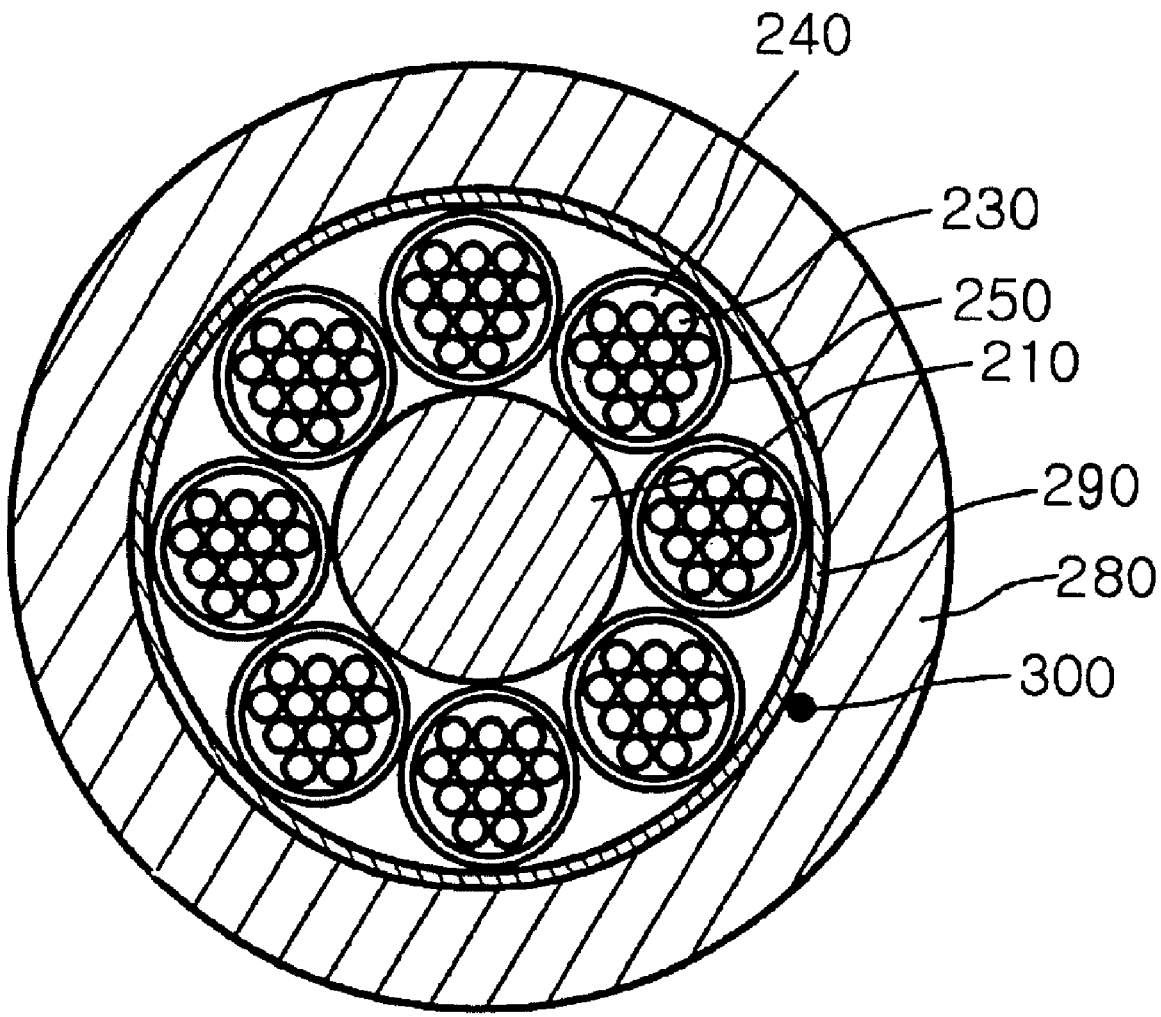

FIG. 2 shows a cross-section of an air-blown fiber-optic cable in accordance with an embodiment of the present invention. The optic cable comprises a central tensile member 210, a plurality of loose tubes 250, aramid yarns 290, an outer sheath 280, and a rip cord 300.

The tensile member 210 provides a tension-resistant force for the optic cable and is located at the center of the cable. The tensile member 210 may be made of FRP.

The loose tubes 250 are stranded helically or reverse-helically (S-Z) around the tensile member 210. The S-Z stranding technique is disclosed in U.S. Pat. No. 4,828,352 to Henrich A. Kraft, entitled "S-Z Stranded Optical Cable". Thus, the detailed explanations regarding the S-Z technique are omitted herein. Twelve optic fibers 230 are mounted in each of the loose tubes 250, and the hollow space of the loose tubes is filled with the jelly compound 240 for protecting the optic fibers 230 from external shock and absorbing moisture permeating the loose tubes 250. Each of the loose tubes has a diameter ranging from 1.8 mm to 2.0 mm, and each of the optic fibers has an excess fiber length of less than 0.05%.

The aramid yarns 290 bind the loose tubes 250, which are S-Z stranded and thus prone to be disentangled from the tensile member 210. It is preferable that the thickness of the aramid yarns 290 do not exceed 5,000 TEX. The aramid yarns 290 exhibit a shrinkage rate lower than those of the existing polyester-based yarns. Therefore, the depression of the loose tubes 250 which occurs when shrinking due to heat, can be minimized. For instance, it is known that the polyester-based yarns exhibit a shrinkage rate of 5% at 100° C. while the aramid yarns 290 exhibit a shrinkage rate of 0.1% or less. The difference of such shrinkage rates greatly contributes to the depression of the loose tubes 250. For example, when binding the loose tubes 250 with tension of about 600 grams, the polyester-based yarns cause the loose tubes to be depressed 0.6 mm while the aramid yarns 290 cause the loose tubes to be depressed 0.15 mm, which is 75% less than the results achieved with polyester-based yarns. Such reduction of the depression of the tubes prevents the increase of light loss due to a reduction of the optic fiber-free window, which occurs at low temperatures because of the small diameter of the loose tubes. In addition, the aramid yarns 290 may comprise swellable aramid yarns with a moisture-absorbing characteristic and rigid aramid yarns with a predetermined strength, in order to maintain the functions of waterproofing, binding, and tension resistance.

The outer sheath 280 is disposed on the outermost part of the optic cable. It can be made of a highly polymerized compound such as PVC, PE, hytrel, nylon and polypropylene, and is manufactured by an extrusion process. In addition, the sheath 280 includes a rip cord 300 adjacent to an inner wall thereof for facilitating its peeling-off action.

As described above, the air-blown fiber-optic cable according to the invention can be applied in the air pressure installation-type construction method by minimizing the outer diameter and the weight of the cable. In addition, the air-blown fiber-optic cable according to the invention requires less material and incidental packaging and transportation expenses.

While the invention has been shown and described with reference to certain preferred embodiments thereof, it will be understood by those skilled in the art that various changes in form and details may be made therein without departing from the spirit and scope of the invention as defined by the appended claims. Therefore, this invention is not to be unduly limited to the embodiment set forth herein, but it is to be defined by the appended claims and the equivalents thereof.

What is claimed is:

1. An air-blown fiber-optic cable comprising: a central tensile member located axially through a center of the optic cable for providing a tension-resistant force; a plurality of loose tubes wound around the tensile member, each tube housing a plurality of optic fibers therein; aramid yarns for binding the loose tubes; and, an outer sheath disposed on the outermost part of the optic cable to protect the interior thereof from the exterior environment, wherein the aramid yarns comprise swellable arachnid yams with a moisture-absorbing characteristic and a rigid aramid yarn, in order to maintain the functions of waterproofing, binding, and tension resistance.

2. The optic cable according to claim 1, wherein the diameter of a tube of said plurality of loose tubes is between 1.8 and 2.0 mm.

3. The optic cable according to claim 1, wherein the outer sheath is made of a highly polymerized compound selected from the group consisting of PVC, PE, hytrel, nylon, and polypropylene.

4. The optic cable according to claim 1, wherein the outer sheath is manufactured using an extrusion process.

5. The optic cable according to claim 1, wherein the outer sheath includes a rip cord adjacent to an inner wall thereof for facilitating the peeling-off of the outer sheath.

6. The optic cable according to claim 1, wherein the thickness of the aramid yarns do not exceed 5,000 TEX.

7. The optic cable according to claim 1, wherein the plurality of loose tubes is reverse-helically (S-Z) wound around the tensile member.

8. The optic cable according to claim 1, wherein the plurality of loose tubes form a helical configuration around the tensile member.

* * * * *